(12) United States Patent
Lenard

(10) Patent No.: US 6,707,905 B2
(45) Date of Patent: Mar. 16, 2004

(54) LOCATION ENHANCED AUTOMATIC WORK DISTRIBUTION

(75) Inventor: Rohan Lenard, Crows Nest (AU)

(73) Assignee: Avaya Technology Corp., Basking Ridge, NJ (US)

(*) Notice: Subject to any disclaimer, the term of this patent is extended or adjusted under 35 U.S.C. 154(b) by 153 days.

(21) Appl. No.: 10/126,061

(22) Filed: Apr. 18, 2002

(65) Prior Publication Data
US 2003/0198337 A1 Oct. 23, 2003

(51) Int. Cl.[7] .................................. H04M 3/00
(52) U.S. Cl. ........................ 379/266.01; 379/201.01
(58) Field of Search .................. 379/201.01, 201.05, 379/265.1, 265.14, 266.01

(56) References Cited

U.S. PATENT DOCUMENTS

| 5,006,983 | A | * | 4/1991 | Wayne et al. ............... 364/401 |
| 5,684,872 | A | | 11/1997 | Flockhart et al. ........... 379/266 |
| 5,828,747 | A | | 10/1998 | Fisher et al. ................ 379/309 |
| 5,905,793 | A | | 5/1999 | Flockhart et al. ........... 379/266 |
| 5,982,873 | A | | 11/1999 | Flockhart et al. ........... 379/266 |
| 6,064,731 | A | | 5/2000 | Flockhart et al. ........... 379/265 |
| 6,084,954 | A | | 7/2000 | Harless et al. .............. 379/140 |
| 6,088,441 | A | | 7/2000 | Flockhart et al. ........... 379/265 |
| 6,163,607 | A | | 12/2000 | Bogart et al. ............... 379/266 |
| 6,173,053 | B1 | | 1/2001 | Bogart et al. ............... 379/266 |
| 6,192,122 | B1 | | 2/2001 | Flockhart et al. ........... 379/266 |
| 6,278,777 | B1 | | 8/2001 | Morley et al. .............. 379/265 |
| 6,292,550 | B1 | | 9/2001 | Burritt ........................ 379/201 |

* cited by examiner

Primary Examiner—Creighton Smith
(74) Attorney, Agent, or Firm—Sheridan Ross P.C.

(57) ABSTRACT

A work distribution system 100 is provided for matching geographically distributed resources 108, such as agents, with a geographically distributed plurality of work items. The work item distribution system 100 includes a resource identifier 102 that determines the resources that are suitable to serve the selected work item, an estimated wait time function 124 that determines an estimated wait time for each suitable resource to serve a selected work item, and a selector function 120 that assigns a value to each enqueued work item and, based on the value and estimated wait time, assigns a resource to the selected work item.

40 Claims, 2 Drawing Sheets

LOCATION ENHANCED AUTOMATIC WORK DISTRIBUTION

FIELD OF THE INVENTION

This invention relates to automated work item distribution systems and particularly to automated work item distribution systems for a geographically distributed work force.

BACKGROUND OF THE INVENTION

There continues to be pressing need for automated work distribution systems that provide optimized or near optimized distribution of labor resources among a plurality of geographically distributed jobs. For example, taxi companies have a highly mobile work force that must be matched with a geographically distributed clientele with differing service needs. Although dispatchers select a client in the taxi driver's general area, the dispatching process is typically not automated, and the performance of the taxi driver is not well tracked and managed. Service levels are typically not a consistently applied consideration in making such work assignments. Moreover, less desirable drivers are often assigned to a client when more desirable drivers are available, leading to a lower level of service for the client and idle or inefficiently used drivers. These results are manifested typically in higher operating and capital costs and lost business due to customer dissatisfaction. Other examples of such roaming work forces include service personnel (e.g., plumbers, telephone service personnel, cable service personnel, computer maintenance personnel and building maintenance personnel), delivery services (e.g., Federal Express™, United Parcel Service™, and consumer retail storefronts), and sales operations.

Although work distribution algorithms are available for centrally located work forces, such as in call centers, such algorithms are unsuitable for roaming work forces. Call centers currently allocate excess work by choosing the next work to be allocated based on predetermined criteria, such as maintaining the business service levels (based upon predicated availability of agents/workers). Compared to a static work force, roaming work forces typically have longer durations of jobs (e.g., a worker might do a couple of jobs an hour or as few as a couple of jobs a day), require roaming workers to have not only the skills to perform the job but also the required (consumable) resources, tools, etc. (which often must be obtained before the job can be completed), and suffer from significant amounts of employment time being consumed by traveling between jobs. With mobile workers the use of call center algorithms will result in less than optimal work performance because travel time will start to dominate work time (workers will be sent to jobs all over the place rather than near where they currently are).

SUMMARY OF THE INVENTION

These and other needs are addressed by the various embodiments and configurations of the present invention. The present invention relates to a methodology for optimizing the assignment of geographically distributed work items to mobile resources for serving those work items at their respective geographic locations.

In a first embodiment of the present invention, a method of assigning the plurality of resources to the plurality of work items is provided that includes the steps of:

(a) selecting a first work item from the plurality of work items;

(b) determining for the first work item a set of estimated wait times, each estimated wait time corresponding to one or more of the plurality of resources and comprising a respective time for the corresponding resource to relocate from at least a first location to a second location corresponding to the location the work is to occur at; and (c) assigning one or more of the resources to the first work item based, at least in part, on the estimated wait time corresponding to the resource. These steps are typically repeated for each item in the plurality of work items prior to, during, or after the performance of the assignment step for another work item.

The determining step is typically performed by comparing a capability level of each of the plurality of resources with one or more required capability levels to service the selected item.

The estimated wait times can include a number of components besides the relocation time. For example, the estimated wait time can include a time for a corresponding resource to complete a current item, a time for a corresponding resource to prepare for serving the selected item, and/or a present wait time for the selected item in a respective queue. The preparation time is typically nonzero where the resource requires objects (e.g., tools or supplies) to serve the selected item and some of the objects are not in the resource's on-hand inventory.

The assigning step can include the step of assigning a corresponding value to each of the plurality of work items. The value can be based on any suitable parameters. Examples include (a) the estimated income that will be derived from the work item, (b) the priority of the customer (corresponding to the work item) and/or a first class of customers of which that customer is a part, (c) at least one service goal for the customer, (d) a service goal for the class of customers, (e) a level of attainment of a service goal for the customer, (f) a level of attainment of a service goal for the class of customers, (g) a service goal for the work item, (h) a service goal for the class of work items of which the work item is a part, (i) a level of attainment of a service goal for the work item, (j) a level of attainment of a service goal for the class of work items, and/or (k) an estimated wait time in a queue.

The assigning step can be performed by selecting the work item with the highest value among the plurality of work items. A suitable resource having the lowest corresponding estimated wait time is then typically assigned to the work item.

The present invention further includes systems for performing the above methodologies.

These and other advantages will be apparent from the disclosure of the invention(s) contained herein. The methodology of the present invention is typically automated and can effectively track and manage mobile resources. Service levels can be applied uniformly in matching work items with resources. Because of more effective utilization of resources, the methodology can lead to a higher level of service for the client, leading to increased business levels and lower capital and operating costs, and fewer idle or inefficiently used resources when compared to conventional work assignment systems. The methodology of the present invention considers the unique characteristics of a roaming/mobile work force when compared to a static work force. Specifically, the estimated wait time algorithm of the present invention effectively considers the longer durations of jobs in a roaming work force, the need for the roaming worker to have not only the skills to perform the job but also the required (consumable) resources, tools, etc. (which often must be obtained before the job can be completed), and the significant amounts of time that can be consumed by traveling between jobs.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
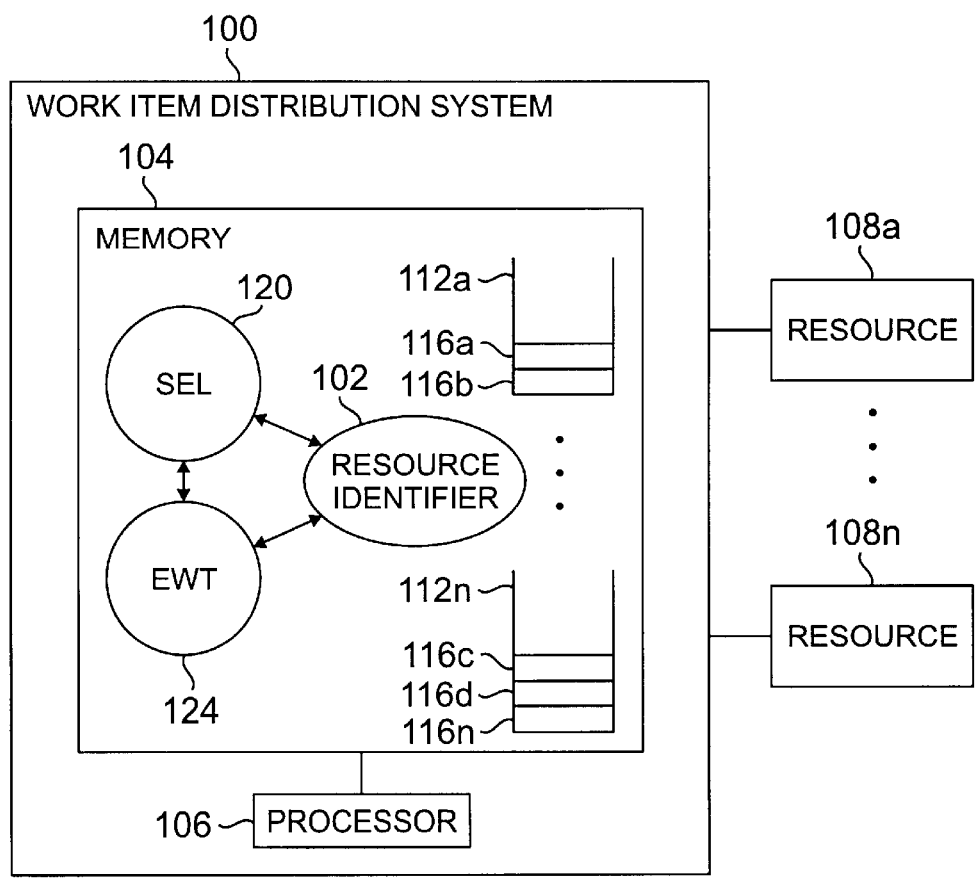
FIG. 1 is a block diagram of a work item distribution system according to an illustrative embodiment of the present invention and FIG. 2 is a flow diagram of operation of the illustrative embodiment of FIG. 1.

FIG. 1 shows an illustrative work item distribution system 100. The system 100 includes memory 104 and processor 106 and is in communication with a number of resources 108a–n. Resources 108a–n can be any mobile, or geographically distributed, entities for providing services and/or sales information to a customer. Although the entity can be a machine, human, and/or computer, in most applications the entity will be a human agent.

Memory 100 includes one or more queues 112a–n of (unassigned) work items or work orders 116a–n to be serviced by the resources 108a–n. The queues may correspond to a particular customer class, work item class, geographic location, or any other suitable classification. Typically when a customer contacts a dispatch facility a work order is manually or automatically entered into an appropriate queue. Voice communications from customers are often manually entered into the computer as an order or work item and placed in an appropriate queue. Non-voice communications from customers, such as through E-mail or an interactive voice response system, can be manually or automatically entered into the computer as an order or work item and placed in an appropriate queue.

Memory 104 can also include a resource identifier 102 for selecting suitable resources 108 for an item, a selector function 120 for matching an enqueued work item with the most desirable resource 108, and an estimated wait time function 124 for determining, based on predefined criteria, an estimated time for a selected resource to complete a selected work item. The operations of these components are discussed in detail below with reference to FIG. 2.

Work item distribution system 100 is typically a stored-program-controlled machine.

Figure 2:
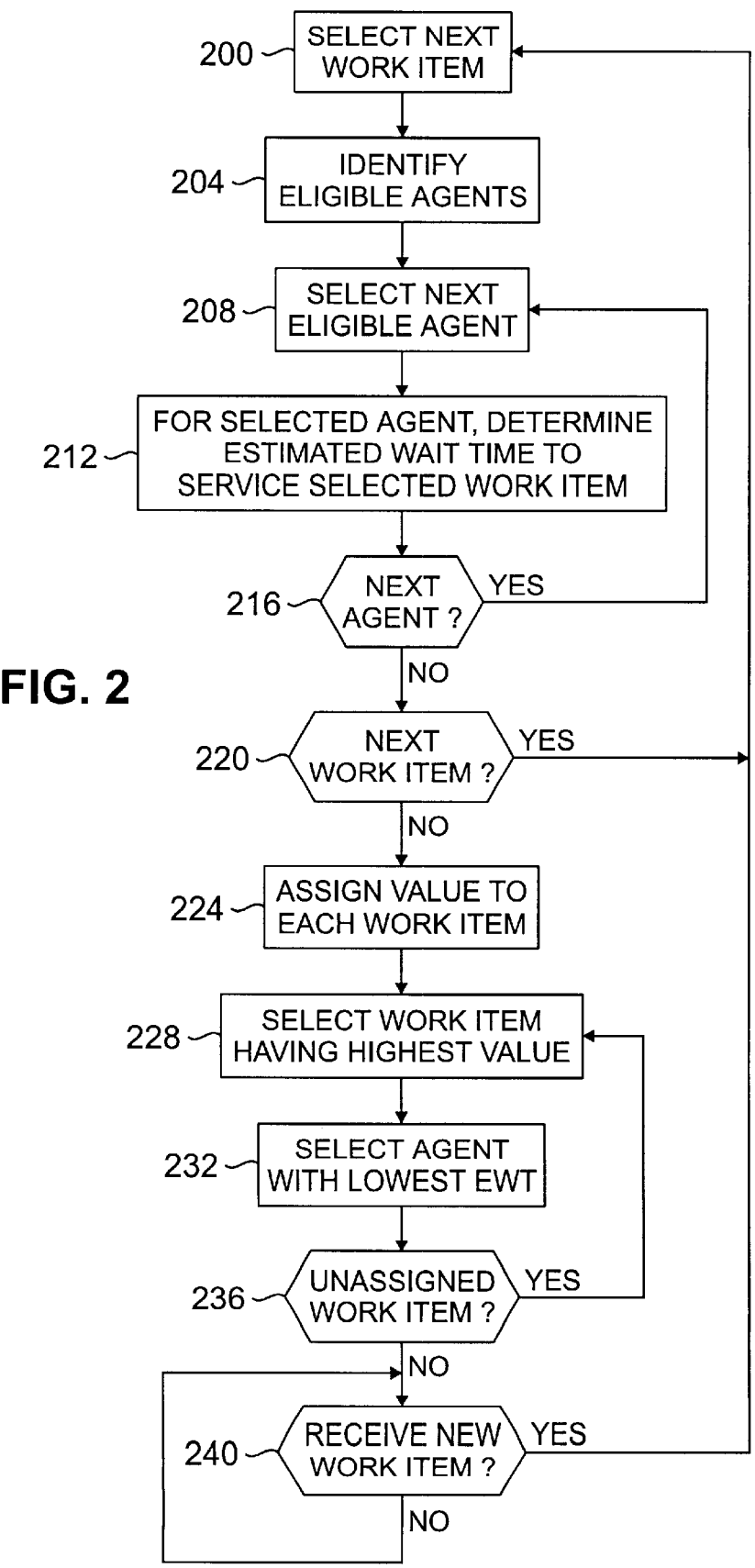

Referring to FIG. 2, the operation of the work item distribution system 100 will be described.

In step 200, the processor 106 selects a next enqueued (unassigned) work item from any one of the queues.

The resource identifier 102 next identifies, in step 204, all of the eligible (or available) resources or agents for the selected work item. This inquiry typically considers whether or not the resource capabilities and skills are suitable for the work item, whether or not the resource is currently or will be, within a predetermined period of time, free to service the selected work item, whether the agent is properly equipped to service the work item, work item or work item class capacity restrictions for each resource or resource class (such as those imposed by a union), and/or resource or resource class capacity restrictions for each work item or work item class (such as those imposed by a union).

When all of the eligible agents are identified, the EWT function 124, in step 212, determines an estimated wait time to service the selected work item. This determination can be based on any suitable mathematical expression. For example, the expression can be:

$$EWT = \text{(Time to complete current work item)} + \text{(Time to prepare for selected work item)} + \text{(Travel time to selected work item)} + \text{(Present wait time)}$$

The time to complete the current work item depends on a number of factors. The time to complete the current work item is, of course, zero if the agent is currently inactive. If the resource is servicing another work item, the time to complete the current work item is typically an estimate based on the type of work item currently being serviced and the skill level of the resource for that type of work item. The time that the agent began working on the current work item is subtracted from this estimate to provide the completion time.

The time to prepare for the selected work item depends on whether or not the agent is equipped to proceed directly to the selected work item. In some applications, the agent does not use a consumable resource and/or tools and, for such agents, this time is zero. If the agent uses consumable resources (such as pipes, pipe fittings, gas, circuit cards, paint, petrol, etc.) and/or tools, the EWT function 124 must determine if the agent has the necessary resources and/or tools to complete the selected work item. If so, the preparation time is zero. If not, the preparation time reflects how long the agent will require to obtain the resources and/or tools for the selected work item. This information can be provided by an inventory of the agent's resources and/or tools coupled with the types of work items serviced since the inventory was determined. Inventory can be determined by any suitable technique, such as automatic query of an inventory system, and manual query of the agent. Knowing what types of work items have been previously serviced permits the EWT function 124 to determine what resources the agent has consumed and therefore what resources remain. Alternatively, the resources and/or tools in the agent's possession can be obtained automatically by a transmitted signal, such as that from an inventory tracking system using bar codes on the resources and/or tools. Finally, a listing of the resources and/or tools in the agent's possession can be obtained from the agent himself.

The next factor in the above equation is the travel time to the selected work item. This estimate can be based on predetermined estimates stored in memory and/or on a human estimate. For example, the EWT function can apply predetermined distance/time estimates to estimate the travel time from the agent's current location to the location of the selected work item. Other travel time estimation algorithms can also be employed. Examples include interpolation based upon the straight line distance, interpolation based on the actual road distance, and data determined from current traffic conditions or patterns.

The location of the agent can be determined by any suitable technique. The location of the agent can be tracked by a location system, such as a Global Positioning System or cellular location system (e.g., using cellular triangulation techniques), and the location forwarded electronically to the EWT function. The location can be assumed to be the same as the agent's last completed (or currently serviced) work item. The location can also be obtained from a communication with the agent himself.

In one configuration, a threshold travel or relocation time is set to allow a business to prevent agents from traveling more than a predefined distance to a job or work item. Agents having a relocation time equal to and/or greater than the threshold are excluded from further consideration respecting assignment to the selected item. (i.e., the agent is considered ineligible to service the selected item).

The last factor in the above equation is the present wait time. This refers to the amount of time that the work item has been enqueued prior to assignment to a resource.

One or more of the factors may be excluded from the equation depending on the application.

Once the estimated wait time is determined, the processor 106 in decision diamond 216 determines whether there is another eligible agent identified in step 204. If there is another eligible agent, the processor 106 returns to step 208 and repeats step 212 for the next eligible agent. If there is not another eligible agent, the processor proceeds to decision diamond 220.

In decision diamond 220, the processor 106 determines whether or not there is another enqueued work item requiring servicing. If so, the processor 106 returns to step 200 and repeats steps 204–216 for that work item. If not, the processor 106 proceeds to step 224.

In step 224, the selector function 120 assigns a value to each of the enqueued work items. The value can be based on any number of criteria. For example, the value can be based on the estimated income that will be derived from the job, the priority or value of the corresponding customer or class of customers of which the customer is a part, the service goals for the corresponding customer or class of customers of which the corresponding customer is a part, the level of attainment of the service goals for the corresponding customer or class of customers of which the corresponding customer is a part, the service goals for the selected work item or class of work items of which the selected work item is a part, the level of attainment of the service goals for the selected work item or class of work items of which the selected work item is a part, and/or the estimated wait time in a queue. Based on one or more of the above, a value is determined and assigned to the selected work item. The mathematical function used to determine a composite value is application-specific. Any suitable mathematical function can be used. Typically, a relative weight will be used for each parameter used to determine the composite value. In this manner, a value is assigned to each enqueued work item.

In step 228, the work item having the highest relative assigned value is selected by the selector function. "Highest" refers to the value identified as having the highest value, e.g., on a scale of 1 to 10, 1 or 10 can be the highest value depending on how the scale is defined. In other words, the selector function compares the assigned values of the enqueued work items and selects that work item having the highest value. The selector function can sort through the enqueued items and organize the enqueued items based on their relative values, from highest value to lowest value or vice versa. In the event that two or more work items have the highest value, the desired work items can be selected based on any suitable criteria, such as when each work item was received, which work item was processed first, or on an arbitrary or random basis.

In step 232, the selector function, for the selected work item, sorts through the eligible agents and assigns to that work item the eligible agent having the lowest estimated wait time. In the event that two or more resources have the lowest estimated wait time, the desired resource can be selected based on any suitable criteria, such as which resource is least utilized over a selected time period, the degree to which each resource has realized predetermined service goals, and the like. The selected work item is then removed from further consideration by removing the work item from the respective queue. The assigned agent may also be removed from further consideration, depending on how long the agent will take to complete the selected work item. In some applications, the various estimated wait times determined for the agent in steps 204–212 for the agent are recomputed for the agent with respect to the remaining enqueued items before step 232 is performed for the next selected work item. In this way, the same agent can be assigned to multiple enqueued work items, such as where multiple enqueued work items are closely located geographically.

In step 236, the selector function determines if there is any unassigned (enqueued) work item. If unassigned work items exist, the selector function repeats step 232 for that work item. If there are no unassigned work items (or the queues are empty), the selector function proceeds to step 240.

In step 240, the processor 106 waits for a new work item to be placed in a queue. When a new work item is enqueued, the processor 106 returns to step 200 and repeats steps 204–236 for the newly enqueued (and later enqueued) work item(s).

A number of variations and modifications of the invention can be used. It would be possible to provide for some features of the invention without providing others. For example in one alternative embodiment, value is determined by assigning different service-time objectives to different types of work items or work item queues for different types of work items. Higher values are assigned for work item types (or queues) that are closest to exceeding (or have most exceeded) assigned service-time objectives. An objective, for example, can be a limit on the amount of time from entering a corresponding queue to the time the work item is serviced. Relative distance of work items from their assigned service-time objectives is preferably determined by determining the work items' present or expected wait times and computing weighted percentages of the assigned service-time objectives that are represented by the present or expected wait times. The weighted percentages are typically determined by dividing the expected wait time by the service-time objective and multiplying the result by 100. The percentages can then be normalized to compensate for differences on orders of magnitude of the objectives of the different queues. For example, each ratio can be weighted by a dividend of the expected time to complete the job from start to finish and the time remaining to expiration of the queue's service-time objective. As will be appreciated, the present wait time refers to the time the work item has been enqueued. The work item with the highest value (or weighted percentage or computed/normalized expired service-time objective ratios) is then selected and assigned to an eligible resource in step 228. If two work items are have the same value (or weighted percentage or computed/normalized expired service-time objective ratios), the work item in the queue with the higher priority is selected. An example of such an approach is set forth in U.S. Pat. No. 5,982,873, which is incorporated herein by this reference.

In another alternative embodiment, the selector function 120 computes in step 224 the difference between the service-time objective and the actual or expected wait time for each of the subject calls by subtracting the expected wait time (obtained in step 212) from the service time objective and then selecting at step 228 the call that has the lowest (including negative) resulting difference.

In yet another alternative embodiment, each work item has a service profile for each type of work item that is to be handled. A service profile can include present values of a plurality of service metrics, such as proficiency or skill required by the agent, profitability of the work item, a rating of the importance of customer satisfaction for the work item, and/or estimated wait time objectives. When a work item of a particular type is considered by the selector function 120 in step 224, the present values of the service metrics of the service profile of that work item type are used according to a selected algorithm to determine value. For example, the present values can simply be summed to provide a composite value.

A skill or capability evaluator can be provided to determine whether a resource is suitable for servicing a work item. A matrix of work item types and suitable skill and/or capability levels would be used by the skill evaluator to determine whether the skill(s) and/or capability identified in a profile of the selected agent matches the work item class or type associated with the selected work item.

In another embodiment, the algorithm tracks performance levels of resources or agents over a predetermined period and reports the tracked performance levels to a supervisor or manager.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of assigning a plurality of resources to a plurality of work items to be served by at least some of the resources, the plurality of resources and work items being geographically distributed, comprising:
   (a) selecting a first work item from the plurality of work items;
   (b) determining for the first work item a set of estimated wait times, each estimated wait time corresponding to at least one of the plurality of resources and comprising a respective time for the corresponding resource to relocate from at least a first location to a second location associated with the first work item; and
   (c) assigning at least one resource in the plurality of resources to the first work item based, at least in part, on the estimated wait time corresponding to the at least one resource.

2. The method of claim 1, wherein at least some of the estimated wait times in the set comprise at least one of a time for a corresponding resource to complete a current work item, a time for a corresponding resource to prepare for serving the first work item, and a present wait time for the first work item in a respective queue.

3. The method of claim 1, further comprising:
   (d) from among the plurality of resources, identifying for the first work item at least one suitable resource for the first work item.

4. The method of claim 3, wherein more than one suitable resource is identified for the first work item.

5. The method of claim 3, wherein the identification step (d) comprises:
   determining whether a capability level corresponding to each of the plurality of resources is suitable for the first work item.

6. The method of claim 1, wherein the determining step (b) is repeated for each work item in the plurality of work items.

7. The method of claim 6, further comprising:
   (d) assigning a corresponding value to each of the plurality of work items.

8. The method of claim 7, wherein a work item's value is based, at least in part, on the corresponding set of estimated wait times.

9. The method of claim 8, wherein the first work item has the highest corresponding value among the plurality of corresponding values and wherein the assigning step (c) comprises:
   comparing the values of each work item in the plurality of work items;
   selecting the first work item based on the comparing step; and
   assigning a first resource to the first work item, wherein the first resource has the lowest estimated wait time in the corresponding set of estimated wait times.

10. The method of claim 9, further comprising:
    (e) selecting a second work item having the next highest value among the plurality of work items; and
    (f) assigning a second resource to the second work item, wherein the second resource has the lowest estimated wait time among a corresponding set of resources suitable to service the second work item.

11. The method of claim 2, wherein at least some of the estimated wait times comprise a respective time for a corresponding resource to complete the first work item and wherein the respective completion time is based, at least in part, on the capability level of the corresponding resource.

12. The method of claim 2, wherein at least some of the estimated wait times comprise a respective time for a corresponding resource to prepare for serving the first work item and wherein the respective preparation time is based, at least in part, on an inventory of objects possessed by the corresponding resource.

13. The method of claim 1, wherein the relocation time is determined based on predetermined estimates of travel time between the first and second locations.

14. The method of claim 7, wherein the first work item corresponds to a first customer and the value is based on at least one of (a) the estimated income that will be derived from the first work item, (b) the priority of at least one of the first customer and a first class of customers of which the first customer is a part, (c) at least one service goal for the first customer, (d) at least one service goal for the first class of customers, (e) a level of attainment of at least one service goal for the first customer, (f) a level of attainment of at least one service goal for the first class of customers, (g) at least one service goal for the first work item, (h) at least one service goal for a first class of work items of which the first work item is a part, (i) a level of attainment of at least one service goal for the first work item, (j) a level of attainment of at least one service goal for the first class of work items, (k) at least one estimated wait time in the set, and (l) a respective position in a queue containing the first work item.

15. The method of claim 1, further comprising:
    (d) selecting a second work item from the plurality of work items;
    (e) determining for the second work item a set of estimated wait times, each estimated wait time corresponding to one of the plurality of resources, each estimated wait time comprising a respective time for the corresponding resource to relocate from at least a third location to a fourth location of the second work item; and
    (f) assigning at least one resource in the plurality of resources to the second work item based, at least in part, on the estimated wait time corresponding to the at least one resource of step (f).

16. The method of claim 15, wherein step (f) is performed after step (c), wherein step (e) is performed after step (b), wherein the resource assigned to the first work item is suitable to serve the second work item, and wherein the set of estimated wait times includes an estimated wait time for the resource assigned to the first work item.

17. A system of assigning a plurality of resources to a plurality of work items to be served by at least some of the resources, the plurality of resources and work items being geographically distributed, comprising:
    (a) selecting means for selecting a first work item from the plurality of work items;
    (b) determining means for determining for the first work item a set of estimated wait times, each estimated wait time corresponding to at least one of the plurality of resources and comprising a respective time for the corresponding resource to relocate from at least a first location to a second location associated with the first work item; and
    (c) assigning means for assigning at least one resource in the plurality of resources to the first work item based, at least in part, on the estimated wait time corresponding to the at least one resource.

18. The system of claim 17, wherein at least some of the estimated wait times in the set comprise at least one of a time for a corresponding resource to complete a current work item, a time for a corresponding resource to prepare for serving the first work item, and a present wait time for the first work item in a respective queue.

19. The system of claim 17, further comprising:
    (d) from among the plurality of resources, identifying means for identifying for the first work item at least one suitable resource for the first work item.

20. The system of claim 19, wherein more than one suitable resource is identified for the first work item.

21. The system of claim 19, wherein the identification means comprises:
    second determining means for determining whether a capability level corresponding to each of the plurality of resources is suitable for the first work item.

22. The system of claim 17, further comprising:
    (d) second assigning means for assigning a corresponding value to each of the plurality of work items.

23. The system of claim 22, wherein a work item's value is based, at least in part, on the corresponding set of estimated wait times.

24. The system of claim 23, wherein the first work item has the highest corresponding value among the plurality of corresponding values and wherein the assigning means comprises:
    comparing means for comparing the values of each work item in the plurality of work items; and
    second selecting means for selecting the first work item based on input from the comparing means, wherein the first resource has the lowest estimated wait time in the corresponding set of estimated wait times.

25. The system of claim 17, wherein at least some of the estimated wait times comprise a respective time for a corresponding resource to complete the first work item and wherein the respective completion time is based, at least in part, on the level of the corresponding resource.

26. The system of claim 17, wherein at least some of the estimated wait times comprise a respective time for a corresponding resource to prepare for serving the first work item and wherein the respective preparation time is based, at least in part, on an inventory of objects possessed by the corresponding resource.

27. The system of claim 16, wherein the relocation time is determined based on predetermined estimates of travel time between the first and second locations.

28. The system of claim 22, wherein the first work item corresponds to a first customer and the value is based on at least one of (a) the estimated income that will be derived from the first work item, (b) the priority of at least one of the first customer and a first class of customers of which the first customer is a part, (c) at least one service goal for the first customer, (d) at least one service goal for the first class of customers, (e) a level of attainment of at least one service goal for the first customer, (f) a level of attainment of at least one service goal for the first class of customers, (g) at least one service goal for the first work item, (h) at least one service goal for a first class of work items of which the first work item is a part, (i) a level of attainment of at least one service goal for the first work item, (j) a level of attainment of at least one service goal for the first class of work items, (k) at least one estimated wait time in the set, and (l) a respective position in a queue containing the first work item.

29. A system of assigning a plurality of resources to a plurality of work items to be served by at least some of the resources, the plurality of resources and work items being geographically distributed, comprising:
    (a) an estimating wait time function operable to determine for a first work item in the plurality of work items a set of estimated wait times, each estimated wait time corresponding to at least one of the plurality of resources and comprising a respective time for the corresponding resource to relocate from at least a first location to a second location associated with of the first work item; and
    (c) a selector function operable to assign at least one resource in the plurality of resources to the first work item based, at least in part, on the estimated wait time corresponding to the at least one resource.

30. The system of claim 29, wherein at least some of the estimated wait times in the set comprise at least one of a time for a corresponding resource to complete a current work item, a time for a corresponding resource to prepare for serving the first work item, and a present wait time for the first work item in a respective queue.

31. The system of claim 29, further comprising:
(d) from among the plurality of resources, a resource identifier operable to identify for the first work item at least one suitable resource for the work item.

32. The system of claim 31, wherein more than one suitable resource is identified for the first work item.

33. The system of claim 31, wherein the resource identifier comprises:
a capability evaluator operable to determine whether a capability level corresponding to each of the plurality of resources is suitable for the first work item.

34. The system of claim 29, wherein the selector function is operable to assign a corresponding value to each of the plurality of work items.

35. The system of claim 34, wherein a work item's value is based, at least in part on the corresponding set of estimated wait times.

36. The system of claim 35, wherein the first work item has the highest corresponding value among the plurality of corresponding values and wherein the selector function is operable to compare the values of each work item in the plurality of work items and select the work item having the highest value, wherein the first resource has the lowest estimated wait time in the corresponding set of estimated wait times.

37. The system of claim 29, wherein at least some of the estimated wait times comprise a respective time for a corresponding resource to complete the first work item and wherein the respective completion time is based, at least in part, on the capability level of the corresponding resource.

38. The system of claim 29, wherein at least some of the estimated wait times comprise a respective time for a corresponding resource to prepare for serving the first work item and wherein the respective preparation time is based, at least in part, an inventory of objects possessed by the corresponding resource.

39. The system of claim 29, wherein the relocation time is determined based on predetermined estimates of travel time between the first and second locations.

40. The system of claim 34, wherein the first work item corresponds to a first customer and the value is based on at least one of (a) the estimated income that will be derived from the first work item, (b) the priority of at least one of the first customer and a first class of customers of which the first customer is a part, (c) at least one service goal for the first customer, (d) at least one service goal for the first class of customers, (e) a level of attainment of at least one service goal for the first customer, (f) a level of attainment of at least one service goal for the first class of customers, (g) at least one service goal for the first work item, (h) at least one service goal for a first class of work items of which the first work item is a part, (i) a level of attainment of at least one service goal for the first work item, (j) a level of attainment of at least one service goal for the first class of work items, (k) at least one estimated wait time in the set, and (l) a respective position in a queue containing the first work item.

* * * * *